March 11, 1930.  J. C. HITCHNER  1,749,766
TIRE
Filed Aug. 11, 1928

INVENTOR.
Joseph C. Hitchner
BY
Herbert S. Fairbanks
ATTORNEY.

Patented Mar. 11, 1930

1,749,766

UNITED STATES PATENT OFFICE

JOSEPH C. HITCHNER, OF PHILADELPHIA, PENNSYLVANIA, ASSIGNOR TO HITCHNER TIRE CORPORATION, OF PHILADELPHIA, PENNSYLVANIA, A CORPORATION OF DELAWARE

TIRE

Application filed August 11, 1928. Serial No. 298,997.

The object of this invention is to devise a novel construction and arrangement of a tire wherein the tread portion is of materially increased depth and is provided with annular pockets to provide for its resilient movements under load on the tire.

With the above and other objects in view, as will hereinafter more clearly appear, my invention comprehends a novel construction and arrangement of a tire.

It further comprehends a novel construction of a tire wherein the tread portion is of increased depth and is provided at each side with an annular pocket located within the tread and having the function of facilitating the resilient movement of the tire.

It further comprehends a novel tire wherein a tread of increased depth is employed having side annular pockets disposed within the tread, with the walls of said pockets extending rearwardly to form the terminal seatings and to enclose the inflatable tube.

It further comprehends a novel tire wherein the side annular pockets are provided in the tread portion, with the tread portion of material depth, so that the inner tube is placed substantially within the inner half of the tire and protected from puncture. and the side walls are split from the pockets in the tread to and through the terminal seatings.

Other novel features of construction and advantage will hereinafter more clearly appear in the detailed description and the appended claims.

For the purpose of illustrating the invention, I have shown in the accompanying drawings a typical embodiment of it, which, in practice, will give satisfactory and reliable results. It is however, to be understood that the various instrumentalities of which my invention consists can be variously arranged and organized, and my invention is not limited to the exact arrangement and organization of these instrumentalities, as herein set forth except by the scope of the appended claims.

Similar numerals of reference indicate corresponding parts.

Referring to the drawings:—

Figure 1:
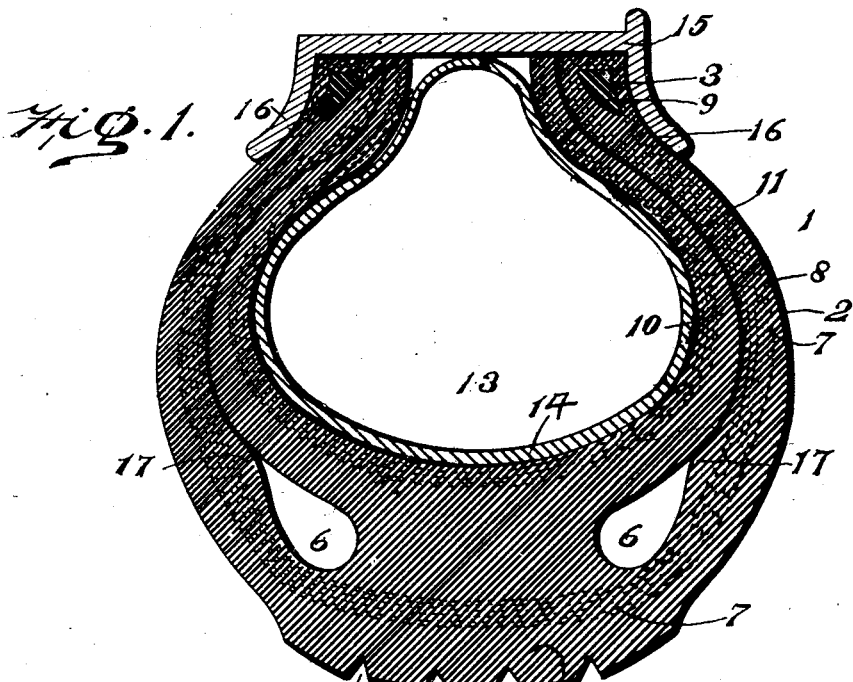
Figure 1 is a sectional view of a tire embodying my invention.

1 designates an annular tire body having side walls 2 which extend inwardly to terminal seatings 3 and which curve outwardly and merge into the tread portion 4, the road contacting portion of which, when not under load, is in the position seen in Figure 1 and is curved and provided with the indentations or recesses 5 to render the road contacting portion of the tread of a non-skid character.

The tread has formed in it annular side pockets 6 which are completely enclosed by the tread portion, and outwardly of said pockets I provide multiple layers of fabric or cord 7 which extend in arch formation across the tread portion and in curvature around the outer walls of the pockets 6 and then curve inwardly on the inner wall of the outer side wall section 8 and are secured around the reinforcements 9 of the terminal seatings 3.

The inner side wall 10 is separated from the outer side wall 8 by means of a line 11 which extends to the side pockets 6 so that the outer side walls or flaps can be bent outwardly to remove, during the process of manufacture, the cores from the side pockets 6.

The inner side wall section 10 is provided with a plurality of layers of reinforcement of fabric or cord, as indicated at 12. This reinforcing fabric is on the inner wall of the inner side walls 10 and extends in curvature around the inner wall of the tread portion so that an annular chamber 13 is formed which is located substantially inwardly of the transverse diameter of the tire.

14 designates the inner tube and 15 designates a rim of any desired or conventional construction which is adapted to receive the terminal seatings of the tire, and, as illustrated, this rim member is provided with the outwardly extending flanges 16 which overhang the terminal seatings.

The annular side pockets 6, which are located within the tread portion, extend into the area between vertical planes through the edges of the tire seatings.

The outer wall of the annular chamber 13 is in arch formation across the tread zone of the tire and is in circular formation at the sides and then flares inwardly towards the rim 15.

The fabric reinforcement 7 preferably may have six or more plies and between the pockets 6 the tire is made of rubber or rubber composition which extends inwardly to the inner fabric reinforcement 12, which, as illustrated, is four ply.

Figure 2:
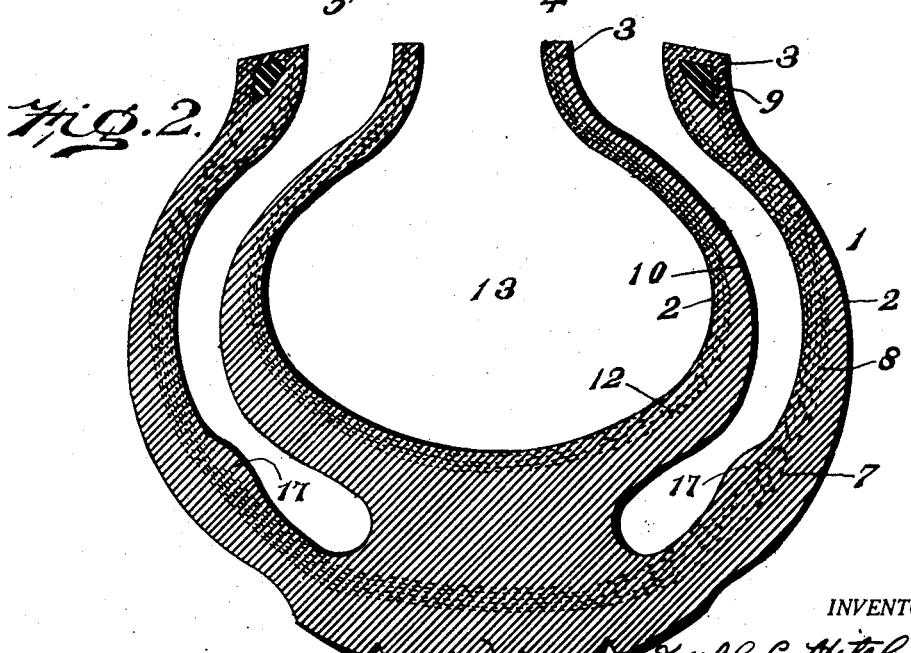
Figure 2 is a sectional view showing the outer portion or layer of the side walls expanded outwardly.

It will be seen that the outer side wall 8 at the inner end of the pocket 6 is of increased thickness to provide a curved bulged portion 17. In the formation of the tire the cores for the annular chambers are removed by expanding the outer side wall 8 as will be understood from Figure 2, and in many cases arising in practice it is advantageous to cement together the walls 8 and 10 so that the annular side pockets 6 will be sealed and the air trapped therein will be retained therein during the life of the tire. This cementing of the side walls 8 and 10 together prevents any relative creeping of said side walls.

It will thus be seen that in operation when the tire is under load and in road contact throughout its road contacting tread portion, the central portion of the tire will move inwardly and carry the main part of the load and the inward movements at the side portions of the tread will be facilitated by the annular side chambers 6.

A tire constructed in accordance with this invention can be operated under either high or low internal pressure as may be desired.

It will now be apparent that I have devised a new and useful tire which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention as set forth in the claims or sacrificing any of its advantages.

Having thus described my invention what I claim as new and desire to secure by Letters Patent, is:—

1. In a tire, an annular resilient body having its tread portion extending inwardly into proximity to the transverse diameter of the tire and provided with spaced textile reinforcements extending in arch formation across the tread and through the side walls to the terminal seatings, said tread having intermediate its depth at opposite sides an annular chamber, the side walls being split from said chamber through the terminal seatings, and the outer of said side walls being inwardly bulged at the inner portion of a juxtaposed side chamber to maintain said side chambers closed at such locations when the tire is under load.

2. In a tire, an annular integral tire body having within it a space to receive an inflatable tube and having an integral tread extending inwardly in proximity to the transverse diameter of the body, said tread having annular pockets at its sides extending into the area between planes of the terminal seatings of the side walls, said body being of substantially the same depth as width in cross section, said body being split from said pockets through the side walls and through the terminal seatings, an inner tensile reinforcement extending from the terminal seatings along the inner wall of the inner section of the side walls and along the inner wall of the tread, and an outer tensile reinforcement extending from the terminal seatings through the outer sections of the side walls, around said pockets and across the tread zone of the tread.

JOSEPH C. HITCHNER.